United States Patent

Habel et al.

[11] Patent Number: 5,818,006
[45] Date of Patent: Oct. 6, 1998

[54] SURFACE PREPARATION ELECTRICAL DISCHARGE APPARATUS AND METHOD

[75] Inventors: Michael Joseph Habel, Ann Arbor; Larry Allen Peterson, Grosse Ile, both of Mich.

[73] Assignee: Ford Global Technologies, Inc., Dearborn, Mich.

[21] Appl. No.: 568,731

[22] Filed: Dec. 7, 1995

[51] Int. Cl.⁶ .................................................. B23H 1/00
[52] U.S. Cl. ...................................... 219/69.17; 219/69.2
[58] Field of Search ............................ 219/69.16, 69.17, 219/69.2, 69.14; 427/540, 580

[56] References Cited

U.S. PATENT DOCUMENTS

| | | | |
|---|---|---|---|
| 2,263,412 | 11/1941 | Armentrout | 219/69.17 |
| 3,754,873 | 8/1973 | Bills et al. | 219/69.17 |
| 3,851,135 | 11/1974 | Moracz et al. | 219/69.17 |
| 4,471,199 | 9/1984 | Michishita et al. | 219/69.17 |
| 4,543,460 | 9/1985 | Inoue | 219/69.17 |
| 4,628,171 | 12/1986 | Colby et al. | 219/69.16 |
| 4,870,243 | 9/1989 | Wilson et al. | 219/69.14 |
| 4,916,282 | 4/1990 | Chamming's et al. | 219/69.2 |
| 4,948,933 | 8/1990 | Thompson | 219/69.2 |
| 5,034,589 | 7/1991 | Evans et al. | 219/69.17 |
| 5,041,709 | 8/1991 | Schneider et al. | 219/69.15 |
| 5,281,788 | 1/1994 | Abiko et al. | 219/69.14 |
| 5,360,957 | 11/1994 | Haefner et al. | 219/69.16 |
| 5,391,850 | 2/1995 | Mueller | 219/69.2 |
| 5,480,497 | 1/1996 | Zaluzec et al. | 219/69.17 |

FOREIGN PATENT DOCUMENTS 2503608 10/1982 France ............................... 219/69.16

Primary Examiner—Geoffrey S. Evans
Attorney, Agent, or Firm—Roger L. May; Joseph W. Malleck

[57] ABSTRACT

An apparatus and method which utilize electrical discharge machining equipment and techniques to prepare an electrically conductive surface for thermal spray coating or for other purposes. The apparatus includes one or more electrodes, with each electrode having a working face, defining a plane. The one or more electrodes are mounted on the leading end of a shaft and can form part of an electrode assembly. The shaft is at least moveable axially by a shaft actuating mechanism and, in some applications, may also rotate the shaft. Each electrode is moveable by a gap setting mechanism in response to and in a direction different than the axial movement of the shaft to form a voltage gap between each working face and the surface being prepared. A supply of dielectric fluid is disposable in the voltage gap. An electrical discharge circuit conducts an electric current through the dielectric fluid in the gap to produce a gap voltage. The shaft actuating mechanism is controlled by a gap voltage control system. An aligning mechanism can be used to maintain each working face in a substantially parallel relation with it corresponding electrically conductive surface. A flexible coupling mechanism can be used to allow the electrodes to move in a plane perpendicular to the shaft.

20 Claims, 6 Drawing Sheets

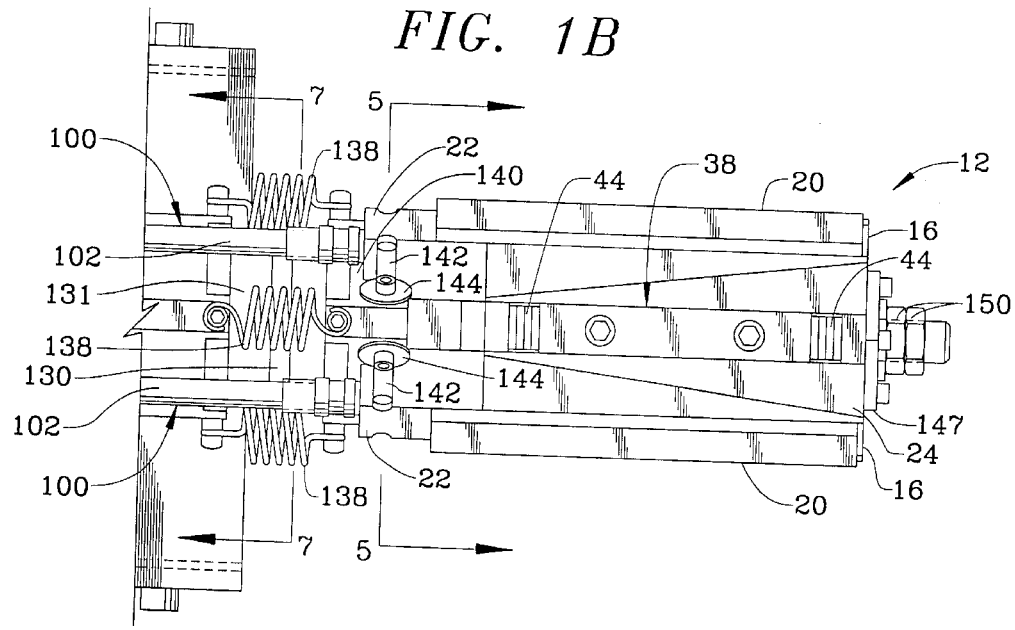
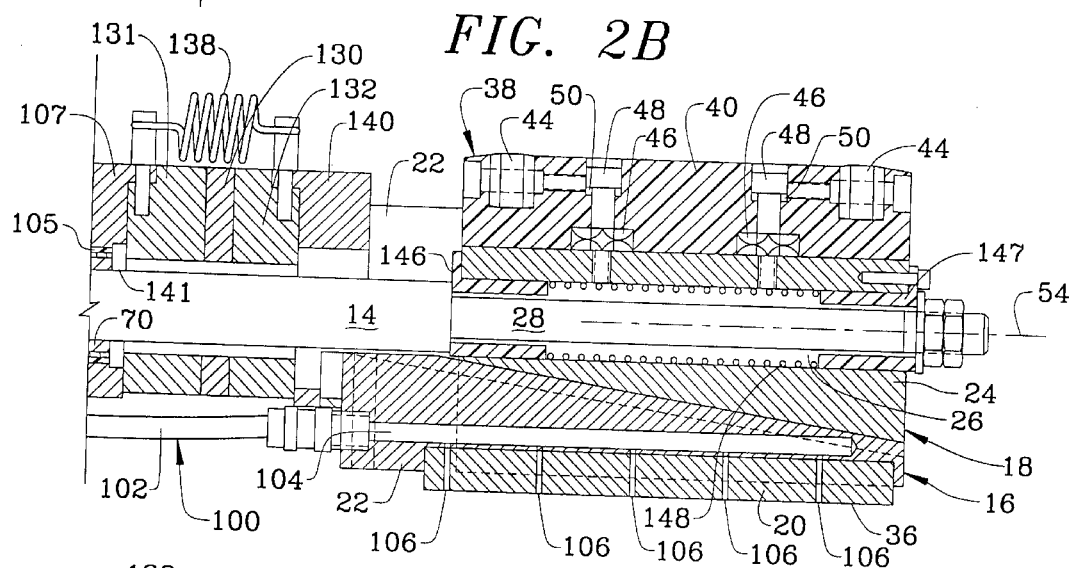
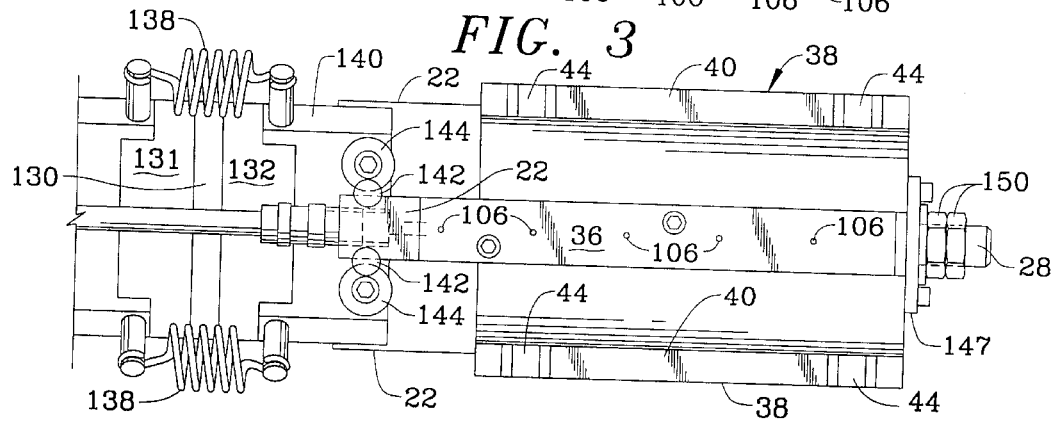

5,818,006

SURFACE PREPARATION ELECTRICAL DISCHARGE APPARATUS AND METHOD

FIELD OF THE INVENTION

The present invention is related to surface preparation techniques, more particularly, to thermal spray coating a surface and, even more particularly, to an apparatus and method for preparing an electrically conductive surface for receiving a thermal spray coating using electrical discharge machining technology.

BACKGROUND OF THE INVENTION

Thermal spray coating techniques are used in a number of applications and are particularly attractive in the automobile manufacturing industry where weight reductions are desired to obtain increased fuel efficiency. For example, it has been proposed to use a thermal spray coating of an iron based material to replace the cast iron sleeve currently used in the cylinder bores of various types of aluminum engine blocks. Such a thermal spray coating can provide the wear characteristics required for the surface of the aluminum cylinder bores and eliminate the weight associated with the cast iron sleeve. In order to obtain optimum adherence of the thermal spray coating, the aluminum bore surface must be properly prepared or roughened before being coated. Grit blasting is one known technique which can be used to prepare the aluminum bore surface for thermal spray coating. However, grit blasting typically requires a thorough cleaning of the blasted aluminum surface followed by the application of an intermediate bonding coat before the iron based thermal spray coating is applied. In addition to the added expense of having to perform these intermediate steps, it is very difficult, if not impossible, to remove all of the grit from the blasted surface and such bonding coats typically contain environmentally unfriendly materials.

The problems associated with grit blasting can be avoided by using an ultra high pressure water jet technique to prepare a surface for thermal spray coating. However, such water jet processes are relatively expensive and difficult to run and maintain. The water jet process is typically so noisy that it must be performed in an enclosed and acoustically shielded area. In addition, the process consumes a great deal of energy to compress large quantities of high purity water. Furthermore, with water jet spraying, the degree to which the surface is prepared or roughened is relatively difficult to control and is more dependant on the condition of the material forming the surface being sprayed.

Therefore, there is a need for a relatively inexpensive apparatus and method capable of accurately controlling the preparation of an electrically conductive surface to optimize the adhesion of a thermal spray coating thereto, regardless of whether the surface being prepared is flat or curved, or an interior or exterior surface. There is a further need for such an apparatus and method which is capable of preparing an electrically conductive surface that does not require a separate cleaning operation to be relatively free of contaminants, such as grit, and which provides for optimum adherence of a thermal spray coating without the need of an intermediate bond coating.

SUMMARY OF THE INVENTION

The present invention satisfies these needs by providing an apparatus and method which utilize electrical discharge machining (EDM) equipment and techniques to prepare an electrically conductive surface for thermal spray coating. It may also be advantageous to utilize the principles of the present invention to prepare a surface for a purpose other than thermal spray coating. Accordingly, the present invention is intended to only be limited by the scope of the appended claims.

In one aspect of the present invention, an apparatus is provided for preparing at least one pre-existing electrically conductive surface on a workpiece. The apparatus includes one or more electrodes, with each electrode having a working face, defining a plane. The one or more electrodes are mounted on the leading end of a shaft or bar. The one or more electrodes can form part of an electrode assembly or tool, but the present invention is not necessarily intended to be so limited. The shaft is at least moveable axially by a shaft actuating mechanism. When the electrically conductive surface is curved, for example when the inside surface of a through hole is being prepared, it may be desirable for the shaft actuating mechanism to also rotate the shaft about its central longitudinal axis.

Each electrode is moveable by a gap setting mechanism in response to the axial movement of the shaft, caused by the shaft actuating mechanism. The movement of each electrode, caused by the axial movement of the shaft, is in a direction different than the axial movement of the shaft. Each electrode is moved by the gap setting mechanism to form a voltage gap between its working face and the electrically conductive surface being prepared. It may be desirable for the gap setting mechanism to move each electrode in a direction substantially perpendicular to the plane of its corresponding working face. When multiple electrodes are used, it is desirable for the gap setting mechanism to move each of the electrodes simultaneously to form a uniform voltage gap, between each electrode working face and its corresponding electrically conductive surface, at substantially the same time. It is also desirable for the gap setting mechanism to move each electrode (i.e., each working face) a fraction of the distance the shaft is moved axially by the shaft actuating mechanism.

The present apparatus also includes a supply of dielectric fluid which is disposable in the voltage gap formed between the working face of each electrode and its corresponding electrically conductive surface. The dielectric fluid being supplied can include any suitable type of dielectric fluid conventionally used in electrical discharge machining. Although, it is desirable for a water based dielectric fluid to be used in order to reduce, if not eliminate, the degree of cleaning required before the thermal spray coating is applied. An electrical discharge circuit is used to conduct an electric current through the dielectric fluid in the gap to produce a gap voltage between each electrode working face and its corresponding electrically conductive surface. The shaft actuating mechanism is controlled by a feed-back or closed-loop gap voltage control system, in response to changes in the gap voltage. The control system includes a sensor for sensing the gap voltage.

While it is known to use EDM equipment and techniques to prepare an electrically conductive surface for thermal spray coating, until now, the surface preparation process has not been controlled using a gap voltage control system, such as that employed in conventional electrical discharge machining operations. That is, until now, the system normally used to control a machining gap, for a conventional electrical discharge machining operation, has not been used to control the movement of an electrode during a surface preparation process, especially when the electrode is being moved in a direction different than that of the shaft mounting the electrode. Because each electrode is moveable in response to movement by the shaft, the control system enables the optimum voltage gap, between each electrode working face and the surface being prepared, to be maintained, even as the electrode wears down with use.

During the surface preparation process minor fluctuations in the actual gap voltage, from a preset gap voltage, are likely to occur. Typical EDM gap voltage control systems may overreact in causing the gap setting mechanism to move each electrode back to the desired voltage gap. By adapting the gap setting mechanism to move each electrode only a fraction of the distance moved by the shaft, any major change in the actual gap voltage, from the preset gap voltage, caused by the gap voltage control system overreacting will be minimized and significant interruptions in the overall surface preparation process reduced. Therefore, with such a gap setting mechanism, an electrically conductive surface can be prepared efficiently and the preparation process controlled with a high degree of accuracy and precision using simpler and less expensive shaft actuating mechanisms and voltage gap control systems. In addition, by using such a gap setting mechanism, each electrode working face can be moved toward and away from the corresponding surface being prepared with a relatively smooth action.

It is desirable to maintain the same voltage gap between the surface being prepared and the entire working face of each electrode so that the electrically conductive surface is more uniformly prepared. To help insure such uniform spacing between each electrode working face and the corresponding surface being prepared, the present apparatus can include an aligning mechanism which maintains each working face in a substantially parallel relation with the electrically conductive surface.

Some workpieces have multiple surfaces which need to be prepared. For example, a single engine block can have 4, 6, 8 or more cylinder bores. For such a workpiece, one apparatus can be used for each surface. With engine blocks, the relative location of the cylinder bores on the same block can vary, within acceptable tolerances, from one block to another. While this variance does not affect the performance of the engine block, it can make it difficult to prepare two or more of the cylinder bores at one time, without having to move and set-up each apparatus anew for each block. To make it easier to prepare the variable multiple surfaces on such workpieces at one time, it is desirable to mount the one or more electrodes on each apparatus using a flexible coupling mechanism which allows movement in a plane perpendicular to, but not along, the longitudinal axis of the shaft. In this way, all the electrodes on each apparatus can be shifted together to compensate for the misalignment, rather than having to move and set-up each apparatus for every workpiece.

It is desirable for the apparatus to include at least one dielectric supply line which directs dielectric fluid from the supply of dielectric fluid into the voltage gap. One example of such a dielectric supply line is a bore formed through at least one electrode, with a dielectric exit of one or more openings in communication with the voltage gap. However, the present apparatus can be used to advantage regardless of whether the workpiece, containing the surface to be prepared, is submerged in a bath of dielectric fluid using conventional sinker techniques or, as disclosed in detail herein, the dielectric fluid is directed to fill and flush through the voltage gap.

For preparing curved or circular surfaces, it has been found desirable for the present apparatus to include a shaft actuating mechanism which is capable of rotating the shaft about an axis of rotation. Such a shaft actuating mechanism can be used to prepare an inner curved surface, such as the inside diameter of a circular bore, or an outer curved surface, such as the outside diameter of a shaft or tube having a circular cross section. When an inner curved surface is being prepared, the working face of each electrode faces outward from the axis of rotation of the shaft. When an outer curved surface is being prepared, the working face of each electrode faces inward toward the axis of rotation of the shaft.

The present apparatus may include pairs of opposing electrically conductive surfaces which are in close proximity and which move relative to one another during the preparation of the electrically conductive surface. An example of such a pair of opposing electrically conductive surfaces may be the ball and race of a metallic ball bearing assembly. To prevent, or at least significantly inhibit, the electrical erosion of one or both surfaces in each pair of such opposing electrically conductive surfaces, it is desirable for the apparatus to be adapted so as to electrically isolate as many pairs of such surfaces as practicable from the electric current supplied by the electrical discharge circuit.

One embodiment of an electrode assembly or tool which may be used with the above described apparatus, or any other suitable electrical discharge machine having an axially moveable shaft, includes the above described one or more electrodes and the gap setting mechanism. The gap setting mechanism is mountable on the axially moveable shaft. One exemplary gap setting mechanism includes at least one first wedging surface disposed at an angle from the shaft when the electrode is mounted thereon. Each first wedging surface is in slidable engagement with a corresponding second wedging surface on each of the electrodes such that axial movement of the shaft causes one wedging surface to slide by the other. This relative sliding movement between the first and second wedging surfaces causes each electrode to move in a direction different than the axial movement of the shaft.

For ease of maintenance, it is desirable for each electrode to include an electrode adapter which mounts a replaceable electrode insert, where the working face of the electrode is formed on the electrode insert. In this way, a worn out working face can be replaced, without having to take the time or incur the cost to replace the entire electrode, by only replacing the electrode insert.

With such an electrode assembly, it may desirable for at least one dielectric supply line to be formed through each electrode, with a dielectric exit of one or more exit openings being formed in each electrode working face. In this way, dielectric fluid can be supplied directly to the working face of each electrode through the dielectric supply line.

For some applications, it may desirable for the electrode assembly to be rotatable around an axis of rotation. It is desirable for such an electrode tool to include a plurality of electrodes disposed in a circle with each working face being directed either outward from or inward toward the axis of rotation.

In another aspect of the present invention, a method is provided for preparing a pre-existing electrically conductive surface. The present method includes the step of providing an electrical discharge machine having an axially disposable shaft with a leading end mounting one or more electrodes. The present method also includes axially moving the shaft and moving each electrode, in response to the axial movement of the shaft, in a direction different than the axial movement of the shaft to form a voltage gap between each working face and its corresponding electrically conductive surface. The present method further includes disposing a dielectric fluid in the voltage gap and conducting an electric current through the dielectric fluid to thereby produce a gap voltage across the gap. Movement of each electrode, and thereby its corresponding voltage gap, is controlled by controlling the axial movement of the shaft in response to changes in the gap voltage.

It is desirable for the step of disposing the dielectric fluid in the voltage gap to include flushing the dielectric fluid through and out of the voltage gap.

While it may include other subsequent operations, the present method can include the step of thermal spray coating the electrically conductive surface.

The objectives, features, and advantages of the present invention will become apparent upon consideration of the detailed description and the appended drawings.

BRIEF DESCRIPTION OF THE DRAWINGS

FIG. 1B is a top view of one embodiment of an electrode assembly mounted on the shaft of the apparatus of FIG. 1A at break line 1;

FIG. 2B is a partially sectioned side view of the electrode assembly of FIG. 1B taken along lines 2B—2B;

FIG. 3 is a bottom view of the electrode assembly of FIG. 1B;

DETAILED DESCRIPTION OR THE INVENTION

Figure 1A:
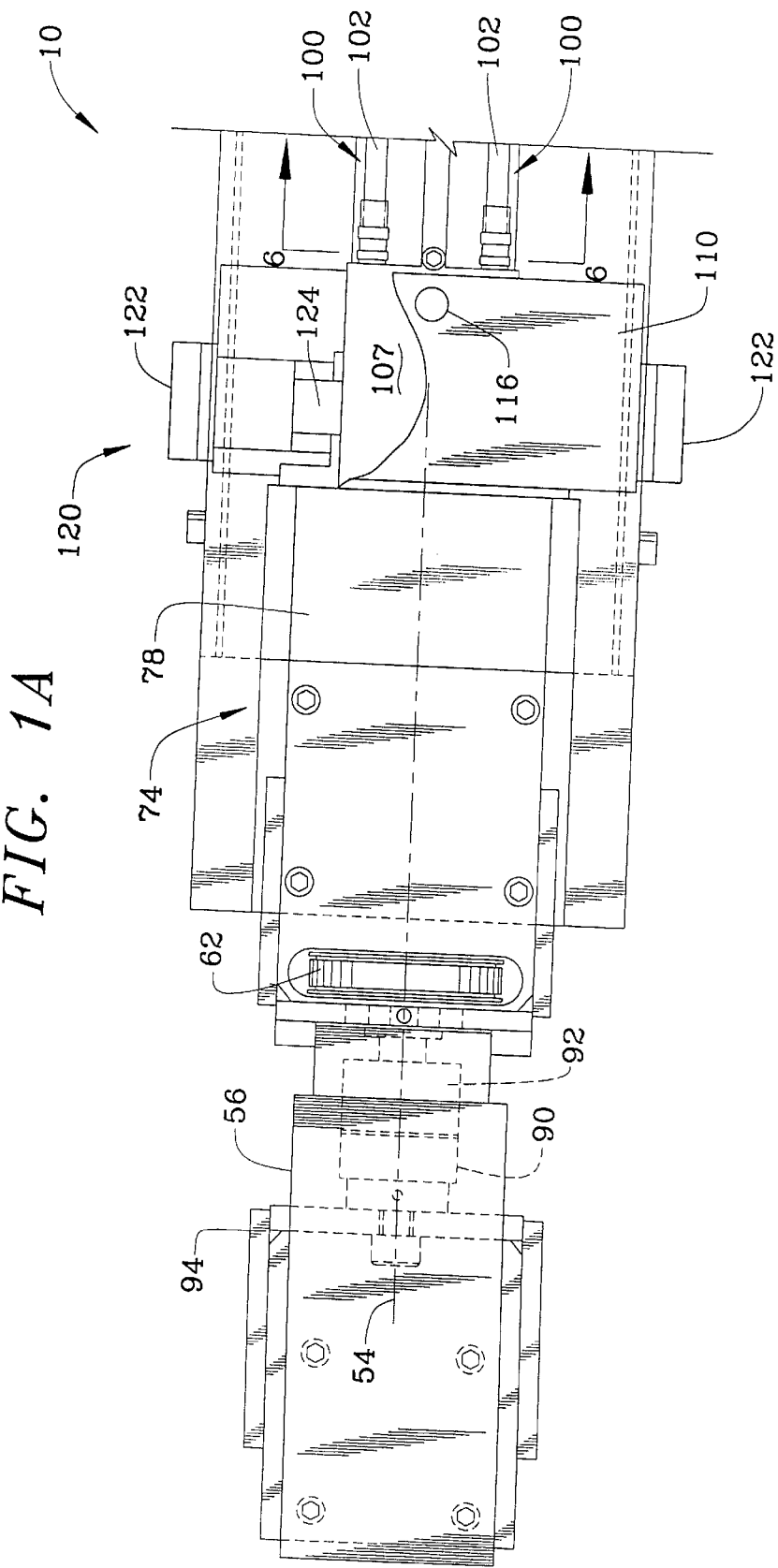
FIG. 1A is a top view of one embodiment of an apparatus for preparing an electrically conductive surface according to the present invention.
Figure 2A:
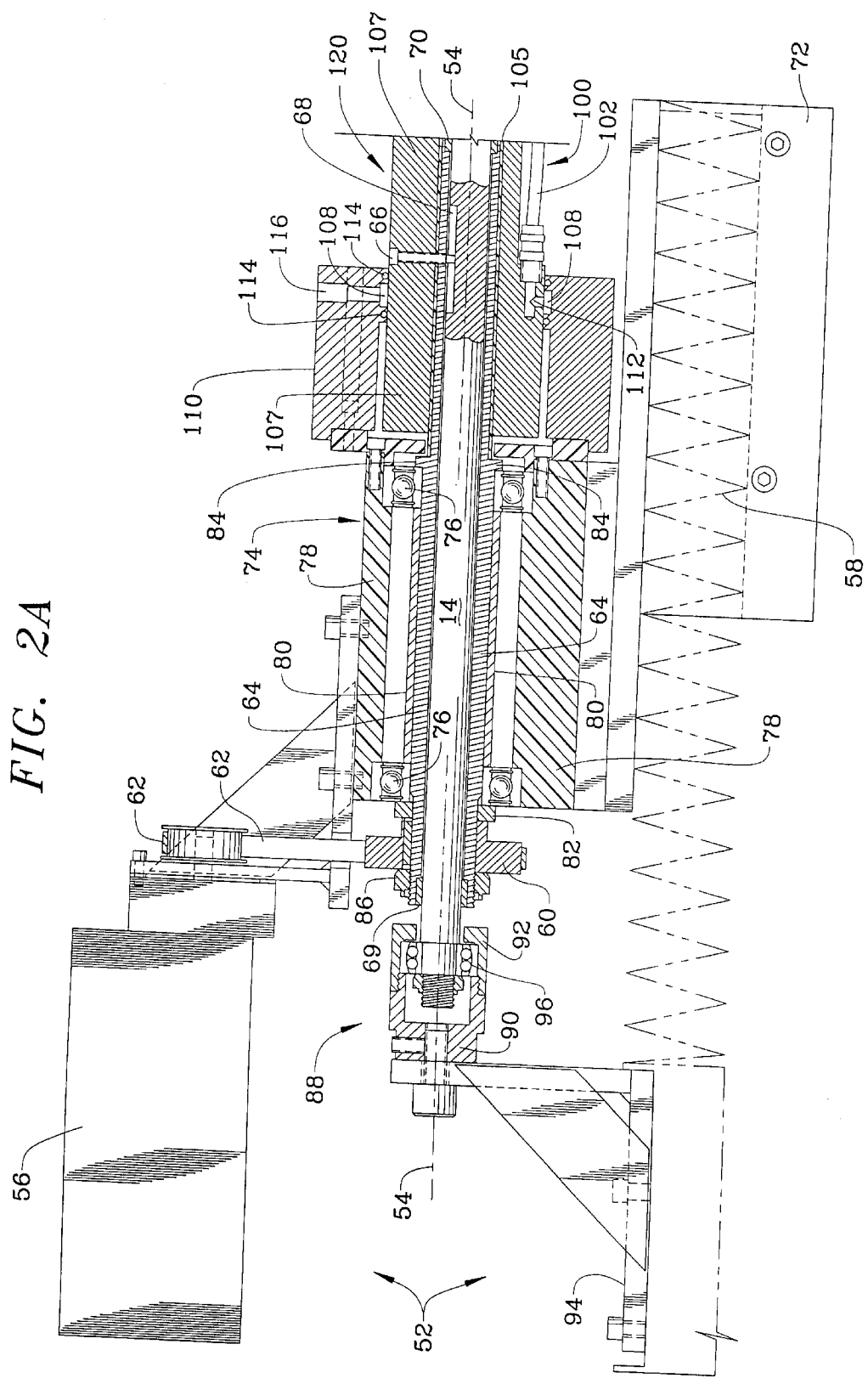
FIG. 2A is a partially sectioned side view of the apparatus of FIG. 1A taken along lines 2A—2A.
Figure 4:
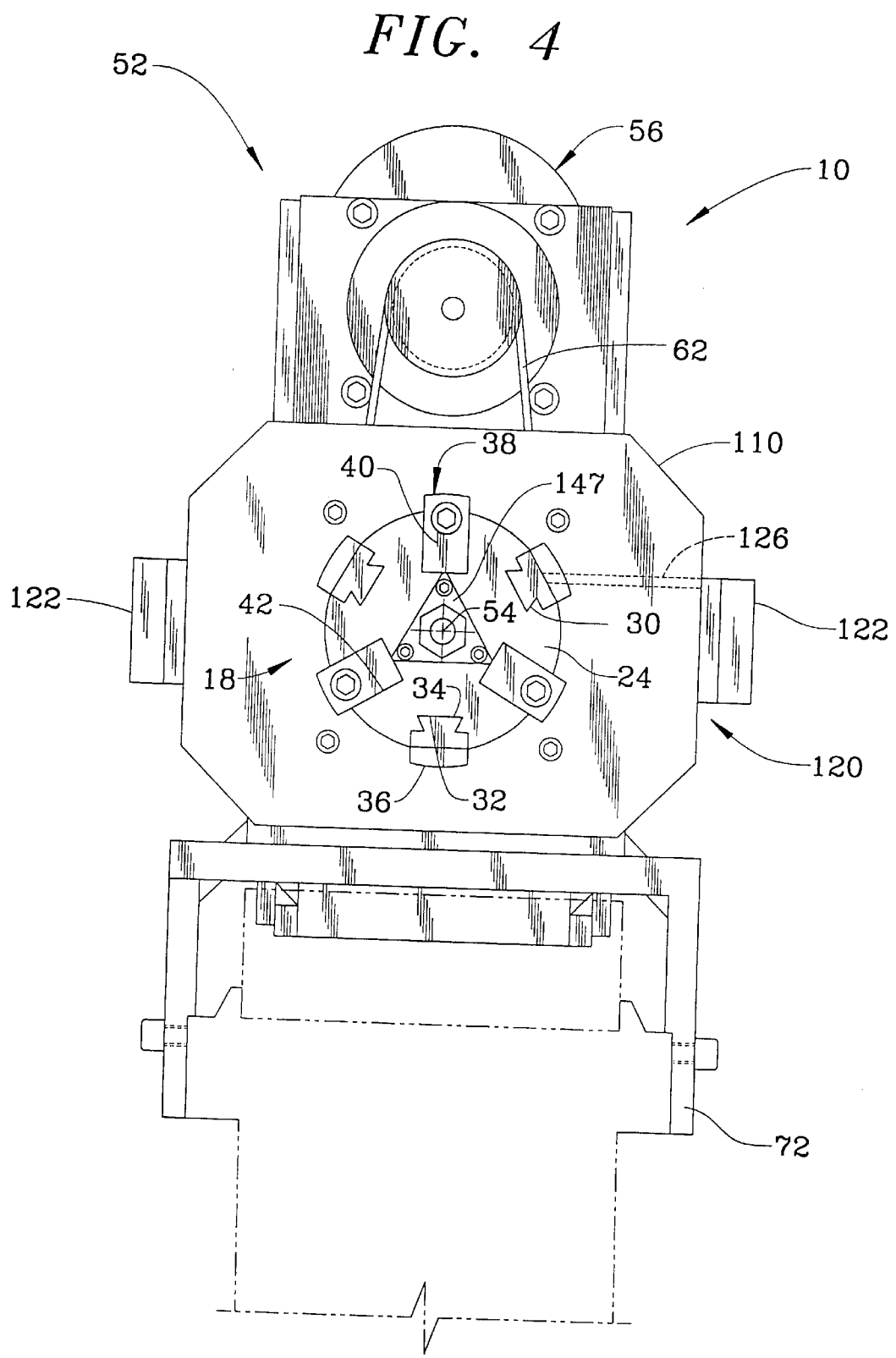
FIG. 4 is an end view of the apparatus of FIG. 1A with the electrode assembly of FIG. 1B mounted on the shaft thereof.

Referring to FIGS. 1–4, one embodiment of an apparatus 10 is shown for preparing an electrically conductive surface, such as the inner wall of a cylinder bore for an engine block (not shown), for receiving a thermal spray coating. The apparatus 10 includes an electrode assembly or tool 12 mounted on the leading end of a drawbar or shaft 14 made, for example, from 360 brass round stock. The electrode assembly 12 includes three two-piece electrodes 16 and a gap setting mechanism 18. Each electrode 16 includes a replaceable electrode insert 20, made of brass, bolted or otherwise removably mounted to an electrode adaptor 22. The gap setting mechanism 18 includes a wedge-shaped electrode housing or wedge 24, made of AMPCO-18 and having a central longitudinal opening 26 for receiving a reduced diameter section 28 of the shaft 14 therethrough. The wedge 24 has three dove-tail slots 13 formed along its length and inclined radially outward from its trailing end towards its leading end. References herein to a trailing, rear or back direction refer to the left side of FIGS. 1A and 2A, and references to a leading, forward or front direction refer to the right side of FIGS. 1A and 2A. Each dove-tail slot 30 is operatively adapted to slidably receive a key-shaped cross section of one of the electrode adaptors 22 lengthwise therein. Each dove-tail slot 30 has a first wedging surface 32 in slidable engagement with a second wedging surface 34 located on the underside of its corresponding electrode adaptor 22. Thus, as described in greater detail below, when the wedge 24 is moved axially the first wedging surfaces 32 slide by the second wedging surfaces 34 and the electrodes 16 move radially outward.

Each electrode insert 20 has a working face 36 which defines one side of a voltage gap between the corresponding electrode 16 and the surface being prepared. To help maintain the same voltage gap (i.e., a uniform spacing) between the surface being prepared and all the surface area of each working face 36, the electrode assembly 12 includes an aligning mechanism 38 which maintains each working face 36 in a substantially parallel relationship with, for example, the inside wall of a cylinder bore. The aligning mechanism 38 includes three nylon centering bars 40 interspersed one between every two adjacent electrodes 16. Each centering bar 40 is spring-loaded into a corresponding slot 42 formed in the electrode housing 24 and includes two nylon rollers 44. The rollers 44 are forced against the inside wall of a cylinder bore by two sets of springs 46, such as crest-to-crest or belleville springs. Each set of springs 46 is disposed in a recess formed on the underside of its corresponding bar 40. Each centering bar 40 is mounted with two bolts 48, so as to only be moveable radially outward a preset distance in its slot 42. The centering bars 40 are shown in the figures in their fully compressed state. The amount of radial extension possible for each centering bar 40 is dependant on the space 50 between the head of each bolt 48 and the bottom of the counter bore the bolt 48 is disposed (see FIG. 2B).

The apparatus 10 includes a shaft actuating mechanism 52 which can alternately and simultaneously rotate and axially move the shaft 14 along and about its central longitudinal axis 54, respectively. The actuating mechanism 52 includes a motor 56 for rotating the shaft 14 and a ball screw assembly 58 (shown diagrammatically) for effecting the axial movement of the shaft 14. The ball screw assembly 58 is driven by a servomotor and controlled using a rotary encoder according to conventional practice, neither of which form a basis for the present invention and are therefore not disclosed herein in detail. The shaft rotating motor 56 drives a pulley 60 through a gear belt 62. The pulley 60 is keyed to rotate the trailing end of a tubular drive shaft 64, made from 1018 steel tubing. Rotation of the drive shaft 64 is transmitted to the drawbar 14 through three radially oriented lock screws 66. Each lock screw 66 is made of an electrically insulative material, such as a suitable plastic, and disposed through the wall of the drive shaft 64 and into a longitudinal slot 68 formed in the drawbar 14.

The actuating mechanism 52 is mounted on a bracket 72 which can be translated to move the electrode assembly 12 in position in a cylinder bore and then fixed in place. To position the electrode assembly 12 in a cylinder bore, the bracket 72 mounting the shaft actuating mechanism 52 is moved. Once the electrode assembly 12 is so positioned, the shaft actuating mechanism 52 is activated to actuate the ball screw assembly 58 and the motor 56 to prepare the cylinder bore surface for thermal spray coating. The drive shaft 64 is mounted to bracket 72 through an electrically isolated bearing assembly 74. The bearing assembly 74 includes two longitudinally spaced ball bearings 76 mounted between the outer surface of the drive shaft 64 and an electrically insulative housing 78 made, for example, of a type C canvas phenolic. The motor 56 is mounted directly to the housing 78. A tubular spacer 80, made of 1018 steel tubing, is disposed around the outside of the drive shaft 64 and between the two ball bearings 76. A ring shaped spacer 82 made, for example, of a C.R. 1018 steel is disposed around the outside of the drive shaft 64 and between the pulley 60 and the trailing bearings 76. The pulley 60 and the bearing assembly 74 are locked in place on the outside of the drive shaft 64 against an annular flange 84 extending out from the drive shaft 64 by a retaining nut 86 threaded on the trailing end of the drive shaft 64.

Two bushings 69 and 70 made of a suitable bearing metal, such as brass, are mounted one at either end on the inside diameter of the drive shaft 64 to help maintain a clearance between the drawbar 14 and the drive shaft 64, while allowing the drawbar 14 to freely move axially relative to the drive shaft 64. The drawbar 14 is mounted at its trailing end to the ball screw assembly 58 by a rotary coupling assembly 88. The rotary coupling assembly 88 enables the drawbar 14 to be moved axially while being rotated. The rotary coupler 88 includes two half-couples 90 and 92 made of 8620 steel and threaded one into the other. The one half-couple 90 is bolted to a bracket 94 which is mounted so as to be moved by the ball screw assembly 58. The other half-couple 92 includes a self-aligning ball bearing 96 to which the trailing end of the drawbar 14 is secured by a retaining nut 98 threaded thereon.

With the electrodes 16 prevented from moving axially, as described in detail later on, axial movement of the drawbar 14 caused by the actuation of the ball screw assembly 58 causes each first wedging surface 32 of the electrode housing 24 to slide by its corresponding second wedging surface 34. When the drawbar 14 is pulled back or pushed forward, so too are the first wedging surfaces 32. The wedging surfaces 32 and 34 are disposed at an angle from the axis 54 of the drawbar 14 so that this axial movement of the electrode housing 24 causes the electrode 16 to move radially out from and in toward the axis 54, respectfully. In this way, the voltage gap formed between each electrode working face 36 and the inside surface of, for example, a cylinder bore being prepared can be controlled by actuating the ball screw assembly 58.

In addition, depending on the angle used, the radial distance traveled by the electrodes 16 can be a fraction of the axial distance traveled by the drawbar 14. Satisfactory results have been obtained when the angle chosen, about 7° from the axis 54, results in the electrodes 16 moving radially about an eighth of the distance moved axially by the drawbar 14. The electrode assembly 12 is mounted to rotate with the drive shaft 64, as described in detail below, when the motor 56 is activated. By rotating the electrode assembly 12, the working face 36 of each electrode 16 can effectively form a voltage gap with all of the inside surface of a cylinder bore being prepared. It is desirable for each electrode 16 to be longer than the cylinder bore is deep to insure preparation of its entire inner surface in one operation.

A supply of dielectric fluid is flushed through three dielectric supply lines 100, into the voltage gap and out the cylinder bore, taking eroded particles of the workpiece with it. Each dielectric supply line 100 includes a teflon hose 102 sheathed with a braid of bronze wire and having an electrically conductive connector at each end. As well be discussed later on, the sheath of bronze wire braid around the hose 102 is used as a path for conducting electricity to the electrodes 16. The leading connector is coupled to the trailing end of a supply bore 104 formed longitudinally in the corresponding electrode adaptor 22. A plurality of exit openings 106 are formed radially through each electrode adaptor 22 and the corresponding electrode insert 20 to connect the supply bore 104 to its working face 36.

The trailing connector is connected to a tubular slip shaft 107, made of copper, which is interlocked for rotation with the drive shaft 64 and the drawbar 14 by the lock screws 66. A nylon isolator sleeve 105 is disposed between the drive shaft 64 and the slip shaft 107. The electrically insulative screws 66 and sleeve 105 electrically isolate opposing electrically conductive surfaces of the drawbar 14 and the drive shaft 64. Each supply line 100 is in communication with an annular supply groove 108, formed on an inside diameter of a housing 110, made of 6061-T651 aluminum, through an elbow bore 112 formed through the slip shaft 107. A pair of 0-rings 114, disposed on either side of the supply groove 108, seal the space between the slip shaft 107 and the housing 110. The annular supply groove 108 is in communication with an external supply of dielectric fluid (not shown) through a connecting bore 116 formed through the aluminum housing 110. The aluminum housing 110 is bolted to the leading end of the electrically nonconductive bearing housing 78 through a washer shaped isolator plate 118, made of nylon. Because it is mounted to the isolator plate 118, electrical erosion between the aluminum housing 110 and the copper slip shaft 107 can be prevented.

An electrical discharge circuit 120 is used to conduct an electric current through the dielectric fluid in the gap between each working face 36 and the inside surface of, for example, a cylinder bore, to produce a gap voltage therebetween. This circuit 120 includes the slip shaft 107, the connectors and sheath of braided brass wire on each hose 102, and each electrode 16. An external electric current is supplied to the circuit 120 through a pair of brush assemblies 122 mounted in the aluminum housing 110 on either side of the copper slip shaft 107. Each brush assembly 122 includes a spring loaded graphite brush 124 which maintains electrical contact with the side of the slip shaft 107 as it rotates.

A drain bore 126 (shown in phantom in FIG. 4) is formed through the side of the housing 110 between the corresponding brush assembly 122 and the back 0-ring 114. Drain bore 126 prevents dielectric fluid, that may leak from the supply groove 108 through the back 0-ring 114, from building up and interfering with the operation of the brush assemblies 122.

Figure 7:
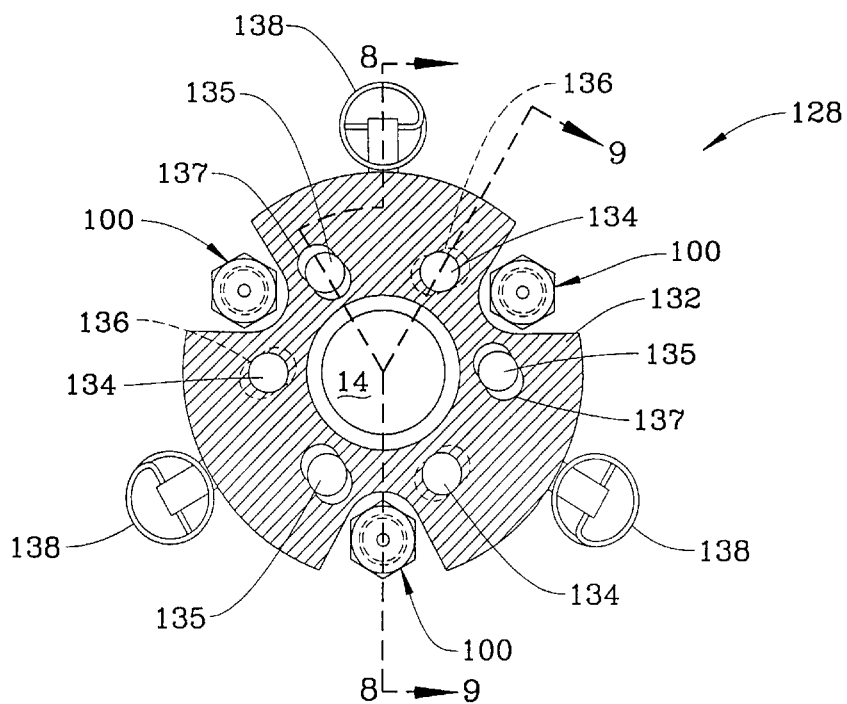
FIG. 7 is a sectional view of the flexible coupling mechanism on the apparatus of FIG. 1A taken along lines 7—7.
Figure 8:
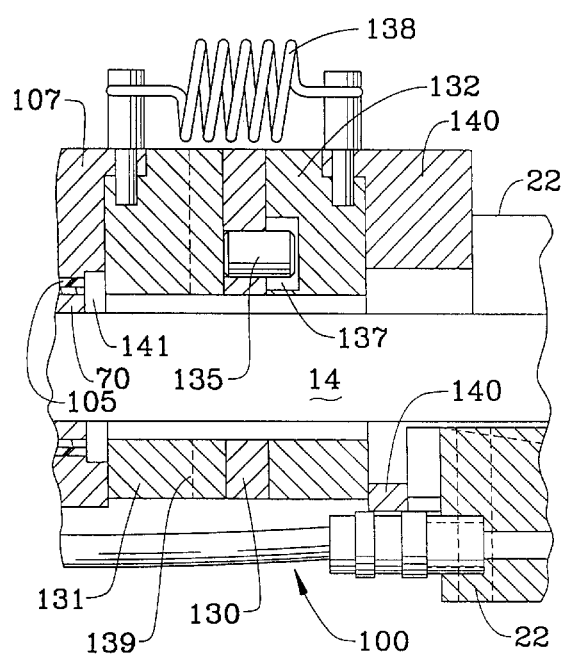
FIG. 8 is a sectional view of the flexible coupling mechanism of FIG. 7 taken along lines 8—8.
Figure 9:
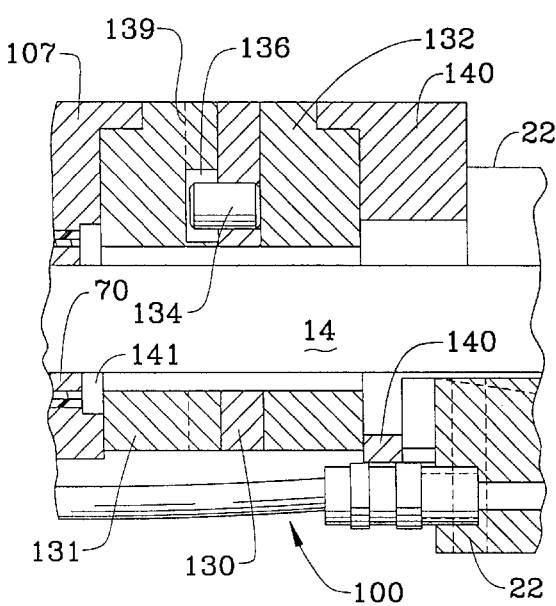
FIG. 9 is a sectional view of the flexible coupling mechanism of FIG. 7 taken along lines 9—9.

Referring to FIGS. 7–9, to make it easier to prepare the inside wall of two or more cylinder bores using two or more of the apparatus 10, it is desirable for each apparatus 10 to include a flexible coupling mechanism or coupler 128 which allows movement of the electrode assembly 12 radially from the axis 54 in an X-Y plane, but not along the axis 54. The flexible coupler 128 includes a central steel plate 130 sandwiched between a first and second steel block 131 and 132. The plate 130 and each block 131 and 132 define a central bore through which the drawbar 14 is disposed. The central plate 130 includes three first pins 134 and three second pins 135 press-fit or otherwise mounted to extend out beyond opposite sides of the plate 130. The pins 134 and 135 are interspersed, one next to the other, so as to be equally spaced circumferentially around the drawbar 14. Each first pin 134 extends into a slot shaped cavity 136 formed in the first block 131, and each of the second pins 135 extends into a slot-shaped cavity 137 formed in the second block 132. Plate 130 and blocks 131 and 132 are spring loaded together with three coil springs 138, equally spaced circumferentially around the outside of elements 130–132. The ends of each spring 138 are bolted one to each block 131 and 132. The coil springs 138 are of sufficient strength to prevent the axial separation of the elements 130–132. The bolts anchoring either end of each spring 138 also secure the blocks 131 and 132 to the leading end of the slip shaft 107 and a brass flange 140, respectfully.

To electrically isolate and thereby prevent electrical erosion within the flexible coupler 128, it may 5 be desirable for a layer of insulative material to be disposed between the first block 131 and the central plate 130. The same electrical isolation may be obtained by using a two piece first block 131, with the two pieces separated by a layer of insulative material (indicated by phantom line 139). It is also desirable, for electrical isolation, to position a space 141 between the leading end of the first block 131 and the insulator sleeve 105, the drive shaft 64 and the bushing 70.

Figure 5:
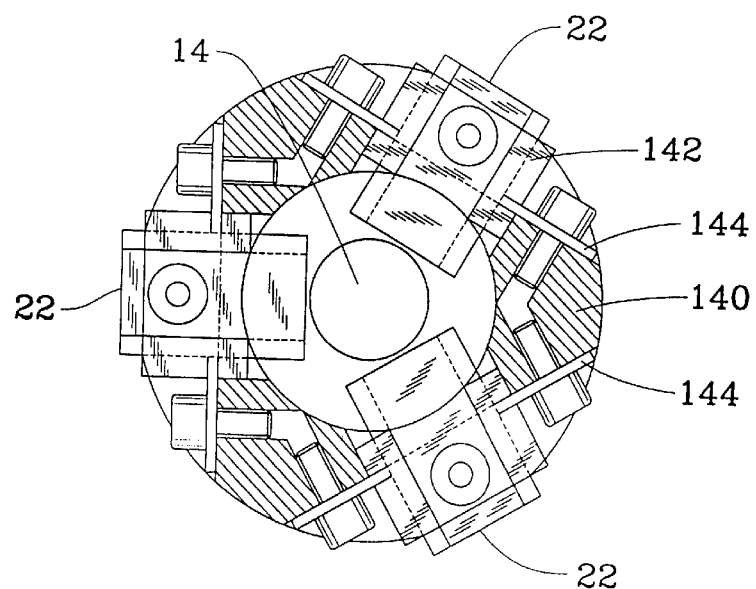
FIG. 5 is a sectional view of the electrode assembly of FIG. 1B taken along lines 5—5.
Figure 6:
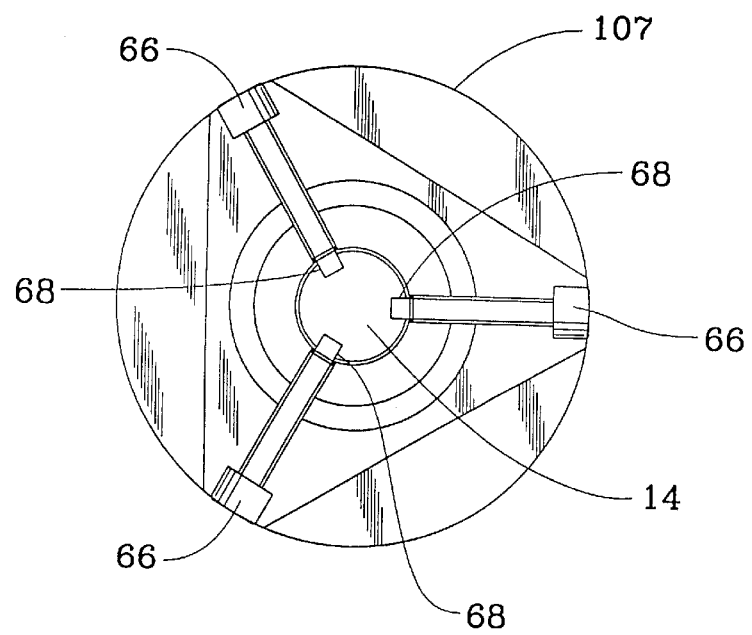
FIG. 6 is a sectional view of the apparatus of FIG. 1A taken along lines 6—6.

The trailing end of electrode adaptor 22 is mounted to the flange 140 so as to prevent axial movement of the electrodes 16 but to allow the electrode adaptors 22 to move radially outward from and inward to the axis 54 in response to rear and forward movement of the wedge 24, respectively. Referring to FIG. 5, such freedom of radial movement can be obtained by mounting each electrode adaptor 22 between two slide pins or dowels 142, with each dowel 142 being disposed in one of two corresponding grooves formed on either side of the trailing end of the electrode adaptor 22. Each dowel 142 is mounted to the flange 140 by a bolt secured washer 144 disposed in a transverse slot formed in the corresponding dowel 142.

To allow the entire electrode assembly 12 to shift radially, as permitted by the flexible coupler 128, the electrode housing 24 is mounted on the leading end of the drawbar 14 so as to radially float thereon. For example, the electrode housing 24 can be mounted using a pair of spring biased flanges 146 and 147 which are disposed at either end in the central opening 26 of the housing 24 and loosely fit around the reduced diameter section of the drawbar 14. The leading flange 147 is bolted to the electrode housing, while the trailing flange 146 is not. A coil spring 148 is disposed between the flanges 146 and 147 and is preloaded by tightening a pair of jam nuts 150, threaded on the leading end of drawbar 14 with a nylon washer. The amount of force required to radially shift the electrode assembly 12, with regard to the drawbar axis 54, can be controlled by the torque applied to the jam nuts 150 and the strength of the coil spring 148.

The shaft actuating mechanism 52 is controlled by a conventional feedback or closed-loop gap voltage control system, in response to changes in the gap voltage during the surface preparation process, compared to a preset gap voltage desired for the gap between each electrode working face 36 and the inside surface of, for example, a cylinder bore. The control system includes a conventional gap voltage sensor. Readings from this sensor are used by a computer controller to actuate the ball screw assembly 58 to axially move the drawbar 14, and thereby the electrode working faces 36 (as described above) to maintain the preset gap voltage. Rotation of the drive shaft 64, and thereby the electrode assembly 12, by activating motor 56, can be controlled manually or by computer control using conventional equipment, as desired.

From the above disclosure of the general principles of the present invention and the preceding detailed description, those skilled in this art will readily comprehend the various modifications to which the present invention is susceptible. Therefore, the scope of the invention should be limited only by the following claims and equivalents thereof.

What is claimed is:

1. An apparatus for preparing at least one electrically conductive surface of a workpiece, said apparatus comprising:
   at least one electrode having a working face, said working face defining a plane;
   a shaft having a leading end mounting said at least one electrode;
   a shaft actuating mechanism operatively adapted for axially moving said shaft;
   a gap setting mechanism being mounted on said shaft and operatively adapted for moving said at least one electrode, in response to the axial movement of said shaft by said shaft actuating mechanism, in a direction different than the axial movement of said shaft to form a voltage gap between said working face and at least one electrically conductive surface of a workpiece;
   a supply of dielectric fluid disposable in the gap formed between said working face and the at least one electrically conductive surface of a workpiece;
   an electrical discharge circuit operatively adapted for conducting an electric current through the dielectric fluid disposed in the gap, thereby producing a gap voltage between said at least one electrode and the at least one electrically conductive surface of a workpiece; and
   a gap voltage control system for controlling said shaft actuating mechanism in response to changes in the gap voltage between said at least one electrode and the at least one electrically conductive surface of a workpiece.

2. The apparatus as set forth in claim 1, wherein said apparatus further comprises an aligning mechanism mounted at said leading end of said shaft and operatively adapted for maintaining said working face substantially parallel with and evenly spaced from the at least one electrically conductive surface of a workpiece.

3. The apparatus as set forth in claim 1, wherein said apparatus further comprises a flexible coupling mechanism mounted on said leading end and operatively adapted to allow movement of said electrode assembly in a direction radial to, but not along, the longitudinal axis of said shaft.

4. The apparatus as set forth in claim 1, wherein said gap setting mechanism is further operatively adapted for moving said at least one electrode a fraction of the distance said shaft is disposed axially by said shaft actuating mechanism and in a direction substantially perpendicular to the plane of said working face.

5. The apparatus as set forth in claim 1, wherein said shaft actuating mechanism is further operatively adapted for rotating said shaft about an axis of rotation and the working face of said at least one electrode faces one of outward from and inward toward the axis of rotation of the shaft.

6. The apparatus as set forth in claim 1, wherein said apparatus further includes pairs of surfaces which are opposing, electrically conductive, in close proximity and move relative to one another, and said apparatus is operatively adapted to substantially isolate said pairs of surfaces electrically from the electric current supplied by said electrical discharge circuit.

7. The apparatus as set forth in claim 1, wherein said at least one electrode is a plurality of electrodes, said shaft actuating mechanism is operatively adapted to also rotate said shaft about its longitudinal axis and thereby rotate said electrodes, and said gap setting mechanism is further operatively adapted for moving each of said plurality of electrodes to form substantially the same gap between each said working face and the at least one electrically conductive surface of a workpiece.

8. An electrode assembly used with an electrical discharge machine, having an axially moveable shaft with a leading end, to prepare at least one electrically conductive surface, said electrode assembly being operatively adapted for being mounted on the leading end of the shaft and comprising:

at least one electrode having a working face defining a plane;

a gap setting mechanism mountable on the shaft of the electrical discharge machine and operatively adapted for moving said at least one electrode, in response to axial movement of the shaft, in a direction different than the axial movement of the shaft to form a voltage gap between said working face and the electrically conductive surface; and an aligning mechanism for maintaining said working face substantially parallel with and evenly spaced from the at least one electrically conductive surface.

9. The electrode assembly as set forth in claim 8, wherein said at least one electrode is a plurality of electrodes and said gap setting mechanism is further operatively adapted for simultaneously moving each of said plurality of electrodes in a direction substantially perpendicular to the axial movement of the shaft in response to the axial disposition of the shaft, to form the same surface preparation gap between each working face and the electrically conductive surface.

10. The electrode assembly as set forth in claim 9, wherein said plurality of electrodes are disposed along a curve with the working face of each of said electrodes facing one of outward from and inward toward the longitudinal axis of the shaft.

11. The electrode assembly as set forth in claim 8, wherein said at least one electrode is moved by said gap setting mechanism, in a direction substantially perpendicular to the plane of its working face, a fraction of the axial distance the shaft is moved.

12. The electrode assembly as set forth in claim 8, wherein said gap setting mechanism includes a first wedging surface disposed at an angle from the shaft when said electrode assembly is mounted thereon, said first wedging surface is in slidable engagement with a second wedging surface on said at least one electrode such that axial movement of the shaft causes one or the other of said first wedging surface and said second wedging surface to slide one by the other and thereby said at least one electrode to move.

13. The electrode assembly as set forth in claim 8, wherein said at least one electrode includes an electrode adapter mounting a replaceable electrode insert and said working face is formed on said electrode insert.

14. The electrode assembly as set forth in claim 8, wherein said electrode assembly further comprises at least one dielectric supply line formed through said at least one electrode and having a dielectric exit of at least one exit opening formed in said working face.

15. The electrode assembly as set forth in claim 8, wherein said electrode assembly has an axis of rotation, said at least one electrode is a plurality of electrodes disposed in a circle with the working face of each of said electrodes facing one of outward from and inward toward said axis of rotation, said gap setting mechanism includes a plurality of first wedging surfaces, one for each of said electrodes, each of said first wedging surfaces is disposed at an angle from the shaft, when said electrode assembly is mounted thereon, and each of said electrodes has a second wedging surface engaged with one of said first wedging surfaces such that axial movement of the shaft causes one or the other of said first wedging surfaces and said second wedging surfaces to slide one by the other and thereby simultaneously move each of said electrodes.

16. A method for roughening at least one electrically conductive surface, said method comprising the steps of:

providing an electrical discharge machine including an axially disposable shaft with a leading end mounting at least one electrode having a working face, the working face defining a plane;

axially moving the shaft;

moving the at least one electrode, in response to the axial movement of the shaft, in a direction different than the axial movement of the shaft to form a voltage gap between the working face and the electrically conductive surface, the voltage gap being set for roughening an electrically conductive surface;

disposing a dielectric fluid in the voltage gap formed between the working face and the electrically conductive surface;

conducting an electric current through the dielectric fluid disposed between the at least one electrode and the electrically conductive surface, thereby producing a gap voltage across the voltage gap, the gap voltage being set for roughening the electrically conductive surface; and controlling the axial movement of the shaft in response to changes in the gap voltage between the at least one electrode and the electrically conductive surface.

17. The method as set forth in claim 16, wherein the step of disposing the dielectric fluid in the voltage gap formed between the working face and the electrically conductive surface includes flushing the dielectric fluid through and out of the voltage gap.

18. The method as set forth in claim 16, wherein said method further comprises the step of maintaining the working face substantially parallel with the electrically conductive surface.

19. The method as set forth in claim 16, wherein said step of moving the at least one electrode includes moving the at least one electrode a fraction of the axial distance the shaft is disposed and in a direction substantially perpendicular to the plane of the working face.

20. The method as set forth in claim 16, wherein said method further comprises the step of thermal spray coating the electrically conductive surface after the surface has been roughened.

\* \* \* \* \*